United States Patent [19]

Feichtinger et al.

[11] 4,013,822

[45] Mar. 22, 1977

[54] CHROMIUM-CONTAINING CATALYST SYSTEMS AND THEIR USE FOR THE POLYMERIZATION OF OLEFINS

[75] Inventors: Hans Feichtinger, Dinslaken; Hans-Walter Birnkraut, Oberhausen; Siegfried Lutze, Gelsenkirchen; Wolfgang Payer, Oberhausen; Dieter Schnier, Wesel-Blumenkamp, all of Germany

[73] Assignee: Ruhrchemie Aktiengesellschaft, Oberhausen, Germany

[22] Filed: July 9, 1975

[21] Appl. No.: 594,481

[30] Foreign Application Priority Data

July 15, 1974 Germany .................. 2433904

[52] U.S. Cl. ..................... 526/129; 252/430; 526/105; 526/156

[51] Int. Cl.² ................. C08F 4/22; C08F 4/62; C08F 10/00

[58] Field of Search ..... 260/93.7, 94.9 D, 94.9 DA; 526/105, 129, 156; 252/430

[56] References Cited

UNITED STATES PATENTS

| | | | |
|---|---|---|---|
| 3,666,743 | 5/1972 | Bower et al. ............ | 260/94.9 B |
| 3,756,998 | 9/1973 | Karapinka ............ | 260/94.9 DA |
| 3,757,002 | 9/1973 | Karol ............ | 260/94.9 DA |
| 3,794,628 | 2/1974 | Bower ............ | 260/94.9 B |
| 3,875,132 | 4/1975 | Kruse ............ | 260/94.9 B |

*Primary Examiner*—Alan Holler
*Attorney, Agent, or Firm*—Burgess, Dinklage & Sprung

[57] ABSTRACT

An olefin polymerization catalyst comprising a chromium compound deposited on a carrier, which chromium compound is complexed with a straight-chain, branched-chain, or cyclic aliphatic hydrocarbon or mixture thereof such that the mol ratio of aliphatic hydrocarbon to chromium compound is 1:2–3, said chromium compound being deposited on said carrier material in an amount between $10^{-3}$ and 10 millimols chromium compound per gram of carrier material, said carrier material also containing a trialkyl, tricycloalkyl, triaryl, monohalodihydrocarbyl, or monoalkoxydihydrocarbyl aluminum compound; a process for preparing such an olefin polymerization catalyst and the use of such catalyst in the polymerization of olefins, particularly ethylene, propylene, 2-methylpropylene and butene-1.

23 Claims, No Drawings

CHROMIUM-CONTAINING CATALYST SYSTEMS AND THEIR USE FOR THE POLYMERIZATION OF OLEFINS

BACKGROUND OF THE INVENTION

1. Field of the Invention

This invention relates to chromium-containing catalyst and more particularly to a chromium-aliphatic hydrocarbon catalyst containing an aluminum reducing agent, the preparation of such an olefin polymerization catalyst and the use thereof in the polymerization of olefins, especially $C_2$–$C_4$ olefins.

2. Discussion of the Prior Art

It is known to polymerize ethylene in the presence of catalysts which comprise chromium (VI) oxides which are deposited on supports such as silica-alumina. For activation, these catalysts are heated, thereby effecting a reduction of the chromium (VI) oxide to lower chromium oxides. Reference is made to Houben-Weyl "Methoden der Organischen Chemie", Vol. 14/1, 1961, page 573. Activation of chromium (VI) oxides may also be effected by means of organic aluminum compounds such as aluminum trialkyls which contain 4 to 12 carbon atoms in the alkyl group. Reference is made to German Offenlegungschriften 2,209,737 and 2,314,412.

Besides chromium(VI) oxides, other chromium compounds such as chromium carboxylates, chromium acetates, chromic acid esters and chromium chelates have been used together with organoaluminum compounds as catalysts for the polymerization of ethylene. Thus, according to German Offenlegungschrift 1,906,589, ethylene may be polymerized in the presence of a catalyst which comprises chromium chloride which is adsorbed on an insoluble inorganic support and of an organoaluminum compound which contains not more than alkoxy groups attached to the aluminum metal atom. The polymerization is carried out at 30° to 200° C and 1.4 to 56 atmospheres in the presence of an inert organic solvent. Small amounts of additional alpha olefins or diolefins can be added to the ethylene to prepare the copolymers.

While catalysts of this type permit the polymerization of olefins, even on a commercial scale, their activity is not satisfactory in all cases. It has therefore become desirable to provide a chromium-containing catalyst system whereby the polymerization of olefins is characterized by high activity which in turn provides high yields of the desired polymer. It has also become desirable to provide a chromium catalyst system which will provide reasonably high molecular weight polyolefin polymers.

SUMMARY OF THE INVENTION

In accordance with this invention there is provided an improved olefin polymerization catalyst, which catalyst comprises a chromium compound deposited on a carrier material, which chromium compound is complexed with a straight-chain, branched-chain or cycloaliphatic hydrocarbon or mixture thereof such that the mol ratio of aliphatic hydrocarbon to chromium compound is 1:2–3, said chromium being deposited on said carrier material in an amount between $10^{-3}$ and 10 millimols chromium compound per gram of carrier material, said carrier material also containing a trialkyl, tricycloalkyl, triaryl, monohalodihydrocarbyl or monoalkoxydihydrocarbyl aluminum compound.

Generally speaking, the catalysts of the invention are characterized by a chromium to aluminum atomic ratio in the range of 1:1–200.

In accordance with this invention hydrocarbon-chromyl complexes are initially formed, and these complexes are deposited on a carrier material. For this purpose, suitable chromium compounds which can be employed include: Chromyl fluoride, $CrO_2F_2$, chromyl chloride, $CrO_2Cl_2$, and chromyl bromide, $CrO_2Br_2$.

The chromium compound, especially chromyl chloride, is contacted with a straight-chain, branched-chain, or cycloaliphatic hydrocarbon or a mixture thereof such that 2–3 mols thereof are complexed with the chromium compound. Particularly preferred aliphatic hydrocarbons for this purpose are those designated by the subgeneric names: Saturated straight-chain and branched-chain aliphatic hydrocarbons with 5 to 40 carbon atoms, cycloaliphatic hydrocarbons with 5 to 40 carbon atoms, the hydrogen atoms of them can be substituted by one or several hydrocarbon radicals with 1 to 6 carbon atoms.

Particularly contemplated specific aliphatic hydrocarbons useful for complexing with the chromium compound, e.g. chromyl chloride, include: 2-methyl-butane, n-hexane, 2-methyl-pentane, 3-methyl-pentane, 2,3-dimethyl-butane, n-heptane, 2,5-dimethyl-pentane, 2,2,3-trimethyl-pentane, cyclohexane, methylcyclohexane, 2,5,5-trimethyl-cyclohexane and mixtures thereof as well as mixtures of hydrocarbons from hydrogenated petroleum distillates, boiling between 50° and 250° C.

When the hydrocarbon complexes with the chromium compound, and the same is deposited on a carrier material, the carrier material generally contains between $10^{-3}$ and 10 millimols, preferably between 0.01 to 1 millimol of the complex chromium compound per gram of carrier material. These hydrocarbon-chromyl complexes which are formed are known per se under the name Etard complexes. A description thereof appears in Chemical Review, Vol. 58 (1958), page 25, the disclosure of which is hereby incorporated herein by reference. They can be prepared by adding highly pure chromium compound, e.g., chromyl chloride, present in solution or as such, to an excess hydrocarbon or mixture thereof. The complex compound gradually deposits in the form of a black-brown precipitate from the red-brown solution which is initially formed. In general, the complexes contain 1 mol hydrocarbon per 2 mols of chromium compound. However, complex compounds composed of 3 mols of chromium compound, e.g, chromyl chloride, per 1 mol of hydrocarbon are also known (see A. Tillotson and B. Houston, *Journal of the American Chemical Society*, 73 (1951) 221 and Ch. Hobbs and B. Houston, *Journal of the American Chemical Society*, 76 (1954) 1254).

In the preparation of the olefin polymerization catalyst of the present invention, it is not necessary for the preparation of the chromium-containing catalyst component to be recovered in the form of the Etard complex and then subsequently treated. Rather, one can carry out the present invention in a simple sequential manner whereby the chromium compound and hydrocarbon are brought into contact with one another in the presence of a carrier material whereby the carrier material contains the chromium compound and hydrocarbon in the complexed state. Generally speaking, during such a process the carrier material is itself suspended in a hydrocarbon or hydrocarbon mixture. In this reaction, the complex compound becomes deposited on the support. The deposition of the chromium compound can be substantially accelerated by heating the suspension to its boiling point.

Suitable carrier supports include particularly inorganic supports, more especially inorganic oxidic supports. Of the carrier materials employed, it is preferred to utilize a carrier material having a relatively high internal surface area of the nature of 200 to 1000 square meters per gram. Materials particularly useful for this purpose include aluminas, aluminum silicates, e.g., bleaching earths of the type of montmorillonites and silica. Before being used, the carrier materials should be thoroughly dried by heating to 200° to 600° C, if necessary while passing through an inert gas.

To reduce the chromium complex, an organoaluminum compound is employed. Generally speaking, the organoaluminum compound is also deposited upon the carrier material. The organo-aluminum compound can suitably be a trialkyl, tricycloalkyl, triaryl, monohalodihydrocarbyl or monoalkoxydihydrocarbyl aluminum compound. Generally speaking, the aluminum compounds which can be employed are those which have the following formula:

$AlX_lY_mZ_n$ wherein X is an unsubstituted, aliphatic or cycloaliphatic or aromatic group; Y is an alkoxy group; Z is a halogen; $l$ is 2 or 3; $n$ and $m$ are each 0, 1 or 2; and $l+n+m = 3$. Also useful is the reaction product of a triisobutyl aluminum with a diolefin. Examples of compounds of the type described above which are particularly useful in reduction of a chromium complex to prepare the olefin polymerization catalyst of the present invention include: triethyl, triisobutyl, tricyclohexyl, monoethoxydiethyl, monochlorodiethyl aluminum and isoprenyl aluminum.

The catalyst system is prepared by mixing the chromium-containing catalyst component which is suspended in an inert solvent with the organoaluminum compound which is itself dissolved in a suitable hydrocarbon. The atomic ratio of chromium to aluminum in the catalyst system is 1:1–200, preferably 1:20–50.

DESCRIPTION OF PREFERRED EMBODIMENTS

A preferred embodiment of the present invention involves a heat treatment of the chromium-hydrocarbon complex while the same is deposited on the carrier material but prior to the time that the organoaluminum compound is added thereto. Thus, it has been found that an important and preferred aspect of the invention is to treat the chromium-hydrocarbon complex alone or while it is in the presence of a suspending agent, e.g., a hydrocarbon or hydrocarbon mixture, to temperatures of 80° to 300° C, preferably 100° to 250° C. By this thermal treatment of the chromium-containing Etard catalyst complex component, the chemical structure of the catalyst is altered, and the catalyst is thus converted into a state which is more active for polymerization. There is clear evidence of chemical alteration in the IR spectrum in the range of 500 to 1600 cm$^{-1}$. This chemical alteration is clearly visible.

Thereafter, the hydrocarbon-chromyl complex is reduced with the organoaluminum compound which is deposited on the carrier material or support. The resultant material is outstandingly suited for olefin polymerization.

Olefin polymerization can be carried out in a known manner at temperatures in the range of from about 20° to about 300° C. Selection of the temperatures depends, inter alia, on the operating pressure, the type of olefin involved, the particular catalyst system and its concentration and on the physical characteristics of the polymer to be obtained. Preferably, polymerization is effected at a temperature in the range of about 30° to 100° C when the catalyst is suspended in an inert hydrocarbon and at a temperature in the range of 100° to 200° C when the catalyst is dissolved in a solution of polymerization process. Particularly high yields are obtained in the temperature range of 70° to 100° C. At higher temperatures, the catalyst systems give polymers having a lower average molecular weight and, therefore, a higher melt flow index.

The reaction of the olefins is normally carried out under superatmospheric pressure, preferably at 5 to 500 bar. Higher and lower pressures can, of course, be employed, especially pressures in the range of 1.4 to 56 atm.

As indicated above, the catalysts of the present invention can be used for olefin polymerization in a number of different forms, i.e., in the form of a suspension or in the form of a solution. When suspension polymerization is to be effected, the type of solvent employed is selected such that it will be inert to the catalyst and the olefin polymer and will be stable at the reaction temperatures used. Examples of suitable solvents include saturated aliphatic hydrocarbons, such as pentane, hexane, heptane, isooctane, chlorinated aliphatic hydrocarbons, saturated cycloaliphatic hydrocarbons such as cyclopentane, cyclohexane, dimethylcyclopentane, and methylcyclohexane. Aromatic hydrocarbons such as chlorobenzene can also be employed. Moreover, soft and hard paraffins having melting points in the range of 40° to 80° C may also be employed as suspending agents.

Separation of catalyst residues in a separate step is unnecessary in the process according to the invention, because the catalyst concentration is sufficiently low that the properties of the polymer are not detrimentally affected. Compounds having acidic hydrogen such as alcohols and organic or inorganic acids may be used to deactivate the co-catalyst.

A particular advantage of the catalyst system is its freedom from film formation which characterizes many catalyst systems, especially those based on titanium. Formation of films could not be observed even at extremely high reaction temperatures employing the catalyst of the invention.

The catalyst system according to the invention is particularly useful in the polymerization of low molecular weight olefins such as ethylene, propylene, 2-methylpropylene and butene-1. In addition, it is suitable for producing copolymers from mixtures of the olefins above mentioned. The polymerization process according to the invention can also be used in connection with agents controlling the molecular weight distribution, such as hydrogen.

In order to more fully illustrate the nature of the invention and the manner of practicing the same, the following examples are presented:

EXAMPLE 1

A. Preparation of the Catalyst System

Into a 100 ml. flask provided with a stirrer, condenser and thermometer are placed 50 ml. of thoroughly dried and hydrogenated straight-run gasoline having a boiling range of 140° to 170° C. and 15.5 mg. (0.1 mmols) chromyl chloride (purity, 99.9%) and 2 g. of bleaching earth containing alumina and silica. The bleaching earth had previously been dried for 8 hours in inert nitrogen stream at 200° C. The reaction mixture is heated for 30 minutes to boiling. The solution which is initially red-brown becomes gradually decolored. Completion of the reaction is indicated by complete decoloration of the solution.

To the resultant suspension of the dark brown hydrocarbon-chromyl chloride complex compound deposited on the support, which is at room temperature and being stirred, is added a 20 wt. % solution of triethyl aluminum in a hydrocarbon (boiling range 140°–170° C). A clearly visible change of color from dark brown to gray takes place.

B. Polymerization with the Use of the Catalyst System According to the Invention Into a 3 liter autoclave equipped with a flat paddle stirrer, a thermocouple, gas inlet pipe and gas vent is placed 1 liter of water- and oxygen-free gasoline under a nitrogen atmosphere, and the gasoline is heated to 140° C while vigorously stirring. Then the supported catalyst system described under (A) above is added to the gasoline. The introduction of gasoline is discontinued and ethylene is introduced into the reactor until a pressure of 50 bar has been established. At the same time, the reaction temperature is increased to 150° C. The beginning and progress of the polymerization is recognizable by the absorption of ethylene. The pressure in the reactor is maintained at a constant level of 50 bar by feeding additional ethylene.

After having discontinued the reaction, the pressure vessel is allowed to cool to room temperature and the polymer having been formed is removed. It is comminuted, mixed with two times the amount of isopropanol and filtered. After washing with isopropanol, the filter cake is dried first in the air and thereafter in a vacuum drying cabinet.

The polyethylene produced in the manner described in this example, run 1, has the following physical characteristics: Melt flow index (g./10 min.) with a load of 5 and 15 kgs. according to DIN 53 735(E) or $MFI_5$ and $MFI_{15}$ value according to ASTM D 1238-65T.

| | | |
|---|---|---|
| $MFI_5$ value | 0.4 | g./10 min. |
| $MFI_{15}$ value | 4.5 | g./10 min. |
| S value = $\frac{MFI_{15}}{MFI_5}$ | 11.3 | |

The S value of 11.3 suggests a wide molecular weight distribution. Therefore, the polyethylene is a well extrudable one.

| | |
|---|---|
| RSV value | 3.9 g./mol. |
| Average molecular weight (measured viscosimetrically) | 420,000 |

The yields of polyethylene obtained with the novel catalyst system are shown in the tables given hereafter. For a comparison, the yields of polyethylene obtained under the same reaction conditions with the following catalyst systems are also shown in the table: Bis-triphenyl silyl chromate on bleaching earth/aluminum triethyl (see U.S. Pat. No. 3,324,095 and U.S. Pat. No. 3,324,101); Chromyl chloride on bleaching earth/aluminum triethyl (See U.S. Pat. No. 3,535,297).

| Run No. | Chromium catalyst on 2.0 g.bleaching earth(Tonsil Optimum (FF) | Triethyl aluminum as 20 wt. % solution in a hydrocarbon mixture to boiling from 140 to 170° C (nmols) | Temp. (° C) | Time (hrs.) | Yield of polyethylene (g.) |
|---|---|---|---|---|---|
| 1 | 0.1 mmols Cr catalyst of this invention | 5.0 | 150 | 1 | 147 |
| | | | | 3 | 260 |
| 2 | 0.1 mmols bis-(triphenylsilyl)-chromate | 5.0 | 150 | 1 | 80 |
| | | | | 3 | 130 |
| 3 | 0.1 mmols chromyl chloride | 5.0 | 150 | 1 | 90 |
| | | | | 3 | 137 |

EXAMPLE 2

The procedure of Example 1 was followed except that aluminum isoprenyl was substituted for triethyl aluminum as the organoaluminum compound.

| Run No. | Chromium catalyst on 2.0 g. bleaching earth (Tonsil Optimum FF) | Aluminum isoprenyl as 20 wt.% solution in a hydrocarbon mixture boiling from 140 to 170° C (mmols) | Temp. (° C) | Time (hrs.) | Yield of polyethylene (g.) |
|---|---|---|---|---|---|
| 1 | 0.1 mmols Cr catalyst of this invention | 5.0 | 150 | 1 | 104 |
| | | | | 3 | 175 |
| 2 | 0.1 mmols Bis-(triphenylsilyl)- | 5.0 | 150 | 1 | 60 |

-continued

| Run No. | Chromium catalyst on 2.0 g. bleaching earth (Tonsil Optimum FF) | Aluminum isoprenyl as 20 wt.% solution in a hydrocarbon mixture boiling from 140 to 170° C (mmols) | Temp. (° C) | Time (hrs.) | Yield of polyethylene (g.) |
|---|---|---|---|---|---|
|  | chromate |  |  | 3 | 95 |
|  | 0.1 mmols chromyl- |  |  | 1 | 60 |
| 3 | chloride | 5.0 | 150 | 3 | 100 |

EXAMPLE 3

The experiments were carried out in the manner described in Example 1 except that the reaction temperature was 80° rather than 150° C.

| Run No. | Chromium catalyst on 2.0 g. bleaching earth (Tonsil Optimum FF) | Triethyl aluminum as 20 wt.% solution in a hydrocarbon mixture boiling from 140 to 170° C (nmols) | Temp. (° C) | Time (hrs.) | Yield of polyethylene (g.) |
|---|---|---|---|---|---|
| 1 | 0.1 mmols Cr catalyst of this invention | 5.0 | 80 | 1 | 274 |
| 2 | 0.1 mmols bis-(triphenylsilyl)-chromate | 5.0 | 80 | 1 | 141 |
| 3 | 0.1 mmols chromyl-chloride | 5.0 | 80 | 1 | 132 |

The polyethylene prepared according to the above example, run 1, has the following physical characteristics:

| | |
|---|---|
| ZST value (flow value) determined by a method similar to ASTM D-1430/65 T at 150° C | 1,400 kp/sq.cm. |
| Tensile strength $\delta_B$ — According to | 34 kp/sq.cm. |
| Ultimate tensile strength $\delta_R$ — DIN 53 4555 | 231 kp/sq.cm. |
| Elongation at break $\delta_R$ — at 120° C | 982 % |
| Density | 0.952 g./cu.cm. |
| Average molecular weight (determined viscosimetrically) | 3,600,000 |
| RSV value | 20 g./100 ml. |

EXAMPLE 4

To determine the efficiency of different organoaluminum compounds, ethylene was polymerized discontinuously and pressurelessly at 80° C in a glass reactor. The catalyst system used for these experiments had the following composition:

a. Reaction product of 10 mmols chromyl chloride and a straight-run gasoline having a boiling range of 140° to 170° C on 2.0 g. of a commercially available aluminum silicate (prepared according to Example 1);
b. 20.0 mmols of the aluminum compounds mentioned hereinafter.

The raw polyethylenes obtained were processed by the same pressure as in case of the experiments carried out under pressure. The yields are summarized in the following table.

| Run No. | Action of various co-catalysts, total amount 20 mmols | Yield of polyethylene (g.) |
|---|---|---|
| 1 | Al(C$_2$H$_5$)$_3$ | 40 |
| 2 | Al(OC$_2$H$_5$)(C$_2$H$_5$)$_2$ | 13 |
| 3 | Al-isoprenyl | 45 |
| 4 | Al⟨Cl / (C$_2$H$_5$)$_2$ | 15 |
| 5 | Al-isoprenyl<br>Al(OC$_2$H$_5$)(C$_2$H$_5$)$_2$ | 6.7 mmols<br>13.3 mmols | 35 |
| 6 | Al(C$_2$H$_5$)$_3$<br>Al(OC$_2$H$_5$)(C$_2$H$_5$)$_2$ | 6.7 mmols<br>13.3 mmols | 55 |
| 7 | Al(C$_2$H$_5$)$_3$<br>Al(OC$_2$H$_5$)(C$_2$H$_5$)$_2$ | 13.3 mmols<br>6.7 mmols | 43 |

EXAMPLE 5

Various carrier materials were tested with the use of the apparatus and under the reaction conditions of Example 4. The reaction product of 1.0 mmol chromyl chloride and a straight-run gasoline having a boiling range of 140° to 170° C (prepared according to Example 1) was deposited by precipitation on 2.0 g. of each of the supports having been dried by thermal treatment at 280° C and used in combination with 20 mmols triethyl aluminum as polymerization catalyst. Inspection of the yields obtained showed that all supports based on SiO$_2$, Al$_2$O$_3$ and aluminum silicates having an internal surface area of 200 to 1,000 sq.m./g. are suitable. Aluminum silicates, preferably those having a SiO$_2$/Al$_2$O$_3$ ratio of 87:13, were found to be particularly active.

EXAMPLE 6

In the experiments described hereinafter, the influence of the Cr/Al atomic ratio in the catalyst system on polyethylene production was investigated. The polymerization was carried out by the procedure of Example 1 with a constant amount of chromium but varying amount of aluminum.

| Run No. | Cr/Al atomic ratio | Yield of polyethylene (g.) |
|---|---|---|
| 1 | 1:20 | 98 |
| 2 | 1:50 | 147 |
| 3 | 1:130 | 143 |

As is shown by the experiments, the yield of polyethylene initially increases as the amount of aluminum increases until a maximum value is reached. Improvement of the yield by further increasing the amount of aluminum in the catalyst system is not possible.

What is claimed is:

1. An olefin polymerization catalyst comprising a chromium compound deposited on a carrier material, which chromium compound is complexed with a straight-chain, branched-chain, or cyclic aliphatic hydrocarbon or mixture thereof such that the mol ratio of aliphatic hydrocarbon to chromium compound is 1:2-3, said chromium compound being deposited on said carrier material in an amount between $10^{-3}$ and 10 millimols chromium compound per gram of carrier material, said carrier material also containing a trialkyl, tricycloalkyl, triaryl, monohalodihydrocarbyl or monoalkyldihydrocarbyl aluminum compound.

2. An olefin polymerization catalyst according to claim 1 wherein said chromium compound is chromyl chloride.

3. An olefin polymerization catalyst comprising a chromium compound deposited on the carrier material, which chromium compound is complexed with a straight-chain, branched-chain or cycloaliphatic hydrocarbon or mixture thereof such that the mol ratio of aliphatic hydrocarbon to chromium compound is 1:2-3, said chromium compound being deposited on said carrier material in an amount between $10^{-3}$ and 10 millimols chromium compound per gram of carrier material, said carrier material also having deposited thereon an organoaluminum compound of the formula $$AlX_lY_mZ_n$$

wherein X is an unsubstituted, aliphatic or cycloaliphatic or aromatic group; Y is an alkoxy group; Z is halogen; $l$ equals 2 or 3; $n$ and $m$ are each 0, 1 or 2; $l+n+m$ equals 3 or the reaction product of triisobutyl aluminum with a diolefin, the chromium/aluminum atomic ratio being in the range of 1:1-200.

4. A catalyst according to claim 3 wherein said chromium compound is chromyl chloride.

5. A catalyst according to claim 3 wherein said organoaluminum compound is triethyl aluminum.

6. A catalyst according to claim 3 wherein said organo-aluminum compound is triisobutyl aluminum.

7. A catalyst according to claim 3 wherein said organoaluminum compound is tricyclohexyl aluminum.

8. A catalyst according to claim 3 wherein said organo-aluminum compound is monoethoxydiethyl aluminum.

9. A catalyst according to claim 3 wherein said organo-aluminum compound is monochlorodiethyl aluminum.

10. A catalyst according to claim 3 wherein said organoaluminum compound is isoprenyl aluminum.

11. A catalyst according to claim 1 wherein the atomic ratio of chromium to aluminum in said catalyst is 1:1-200.

12. A catalyst according to claim 3 wherein the atomic ratio of chromium to aluminum in said catalyst is 1:20-50.

13. A catalyst according to claim 3 wherein said carrier material is an inorganic carrier material having an internal surface area of 200-1000 square meters per gram.

14. A catalyst according to claim 13 wherein said carrier material is selected from the group consisting of aluminas, alumina silicates and silicas.

15. A catalyst according to claim 1 wherein said chromium compound is present on said carrier in an amount of 0.01 to 1 millimol per gram of carrier.

16. A catalyst according to claim 1 wherein said aliphatic hydrocarbon is a straight-run gasoline.

17. A catalyst according to claim 1 which has been heated to 80°-300° C.

18. A process of preparing the catalyst of claim 1 which comprises depositing onto a carrier material a chromium complex by contacting the same with a chromium compound and a straight-chain, branched-chain or cyclic aliphatic hydrocarbon, thereafter heating the carrier material containing chromium complex at 80°-300° C for between 5 and 120 minutes and subsequently depositing onto said carrier material a trialkyl, tricycloalkyl, triaryl, monochlorodihydrocarbyl or monoalkoxydihydrocarbyl aluminum compound.

19. A process according to claim 18 wherein subsequent to deposit of chromium complex but prior to deposit of the aluminum compound the carrier material containing chromium complex is heated at a temperature in the range of 100°-250° C.

20. A process for polymerizing an olefin which comprises contacting olefin under polymerization conditions with the catalyst of claim 1.

21. A process for polymerization of an olefin which comprises contacting an olefin under polymerization conditions with the catalyst of claim 3.

22. A process according to claim 20 wherein said olefin is selected from the group consisting of ethylene, propylene, 2-methylpropylene and butene-1.

23. A process according to claim 22 wherein said polymerization is carried out in a substantially oxygen- and water-free environment at 20°-300° C.

* * * * *

UNITED STATES PATENT AND TRADEMARK OFFICE
CERTIFICATE OF CORRECTION

PATENT NO. : 4,013,822
DATED : March 22, 1977
INVENTOR(S) : Hans Feichtinger et al It is certified that error appears in the above-identified patent and that said Letters Patent are hereby corrected as shown below:

Column 6, lines 36-37, "eart-h/aluminum" should read
-- earth/alumuninum --.

Column 6, line 46 and
Column 7, Example 3, in the column heading:"(nmols)"should
read -- (mmols) --.

Signed and Sealed this

Fourteenth Day of June 1977

[SEAL]

Attest:

RUTH C. MASON
*Attesting Officer*

C. MARSHALL DANN
*Commissioner of Patents and Trademarks*